United States Patent
Yokoyama et al.

(10) Patent No.: US 11,326,658 B2
(45) Date of Patent: May 10, 2022

(54) DISC BRAKE

(71) Applicant: TOYOTA JIDOSHA KABUSHIKI KAISHA, Toyota (JP)

(72) Inventors: Tomohiro Yokoyama, Toyota (JP); Kazuya Hamaguchi, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 77 days.

(21) Appl. No.: 16/836,252

(22) Filed: Mar. 31, 2020

(65) Prior Publication Data

US 2020/0325945 A1 Oct. 15, 2020

(30) Foreign Application Priority Data

Apr. 10, 2019 (JP) .............................. JP2019-074930

(51) Int. Cl.
| | |
|---|---|
| F16D 55/226 | (2006.01) |
| B60T 1/06 | (2006.01) |
| F16D 65/092 | (2006.01) |
| F16D 65/00 | (2006.01) |
| F16D 65/18 | (2006.01) |
| F16D 55/00 | (2006.01) |

(52) U.S. Cl.
CPC ............ *F16D 55/226* (2013.01); *B60T 1/065* (2013.01); *F16D 65/0056* (2013.01); *F16D 65/0068* (2013.01); *F16D 65/092* (2013.01); *F16D 65/183* (2013.01); *F16D 2055/0008* (2013.01); *F16D 2055/0016* (2013.01)

(58) Field of Classification Search
CPC ....... F16D 55/225–227; F16D 55/0016; F16D 55/0025; F16D 65/0025; F16D 65/0068; F16D 65/0075; F16D 65/18

USPC ........ 188/71.1, 72.4, 72.5, 73.43–73.47, 370
See application file for complete search history.

(56) References Cited

U.S. PATENT DOCUMENTS

| | | | |
|---|---|---|---|
| 3,456,766 A | 7/1969 | Beller | |
| 3,493,084 A | 2/1970 | Maurice | |
| 3,912,051 A * | 10/1975 | Yokoi | ................... F16D 55/226 |
| | | | 188/72.5 |
| 3,933,226 A * | 1/1976 | Maurice | ................ F16D 55/226 |
| | | | 188/72.5 |
| 10,883,556 B2 * | 1/2021 | Yokoyama | ............ F16D 65/183 |

(Continued)

FOREIGN PATENT DOCUMENTS

| | | |
|---|---|---|
| DE | 1750907 A1 | 3/1972 |
| DE | 2421855 A1 | 11/1974 |

(Continued)

*Primary Examiner* — Christopher P Schwartz
(74) *Attorney, Agent, or Firm* — Sughrue Mion, PLLC

(57) ABSTRACT

A disc brake includes: an inner pad and an outer pad respectively located on opposite sides of a rotor; a pressing device that presses the inner pad and the outer pad against the rotor; and a housing holding the pressing device. The pressing device includes: at least one first pressing member movable toward the rotor and at least one second pressing member movable away from the rotor; and a driving member movable relative to the housing in an axial direction parallel with a rotation axis of the rotor and configured to be moved by movement of the at least one second pressing member to press the outer pad against the rotor. The housing is provided with a torque receiver that receives torque acting on the outer pad in operation of the disc brake.

4 Claims, 13 Drawing Sheets

(56) References Cited

U.S. PATENT DOCUMENTS

2018/0195564 A1* 7/2018 Yoshikawa ............. B60T 13/74
2019/0176781 A1* 6/2019 Yokoyama ............. B60T 1/065

FOREIGN PATENT DOCUMENTS

| | | |
|---|---|---|
| DE | 2444788 A1 | 4/1975 |
| DE | 2557302 A1 | 6/1977 |
| GB | 1420427 A | 1/1976 |
| GB | 1481687 A | 8/1977 |
| GB | 1519549 A | 8/1978 |
| JP | 2017-020644 A | 1/2017 |
| JP | 2017-207104 A | 11/2017 |
| JP | 2019-100530 A | 6/2019 |

* cited by examiner

DISC BRAKE

CROSS REFERENCE TO RELATED APPLICATION

The present application claims priority from Japanese Patent Application No. 2019-074930, which was filed on Apr. 10, 2019, the disclosure of which is herein incorporated by reference in its entirety.

BACKGROUND

The following disclosure relates to a disc brake mounted on a wheel of a vehicle.

Patent Document 1 (Japanese Patent Application Publication No. 2017-020644) discloses a floating-type disc brake including: an inner pad and an outer pad respectively located on opposite sides of a rotor rotatable with a wheel; a pressing device configured to press the inner pad and the outer pad against the rotor; and a housing mounted on a non-rotating member and holding the pressing device. The pressing device includes: a first pressing member held by the housing and movable toward the rotor; a second pressing member held by the housing and movable away from the rotor; and a caliper held on the housing so as to be movable in a direction parallel with a rotation axis of the rotor and configured to move in response to movement of the second pressing member to press the outer pad against the rotor. Torque acting on the outer pad is received by the caliper.

SUMMARY

Accordingly, an aspect of the disclosure relates to improvement of a disc brake including a first pressing member and a second pressing member, for example, reduction in movement and rubbing of a driving member that is moved by movement of the second pressing member to press an outer pad against a rotor.

In the present disc brake, torque acting on the outer pad is received by a housing. This configuration reduces movement and rubbing of a driving member due to the reception of the torque acting on the outer pad.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

EMBODIMENTS

Figure 1:
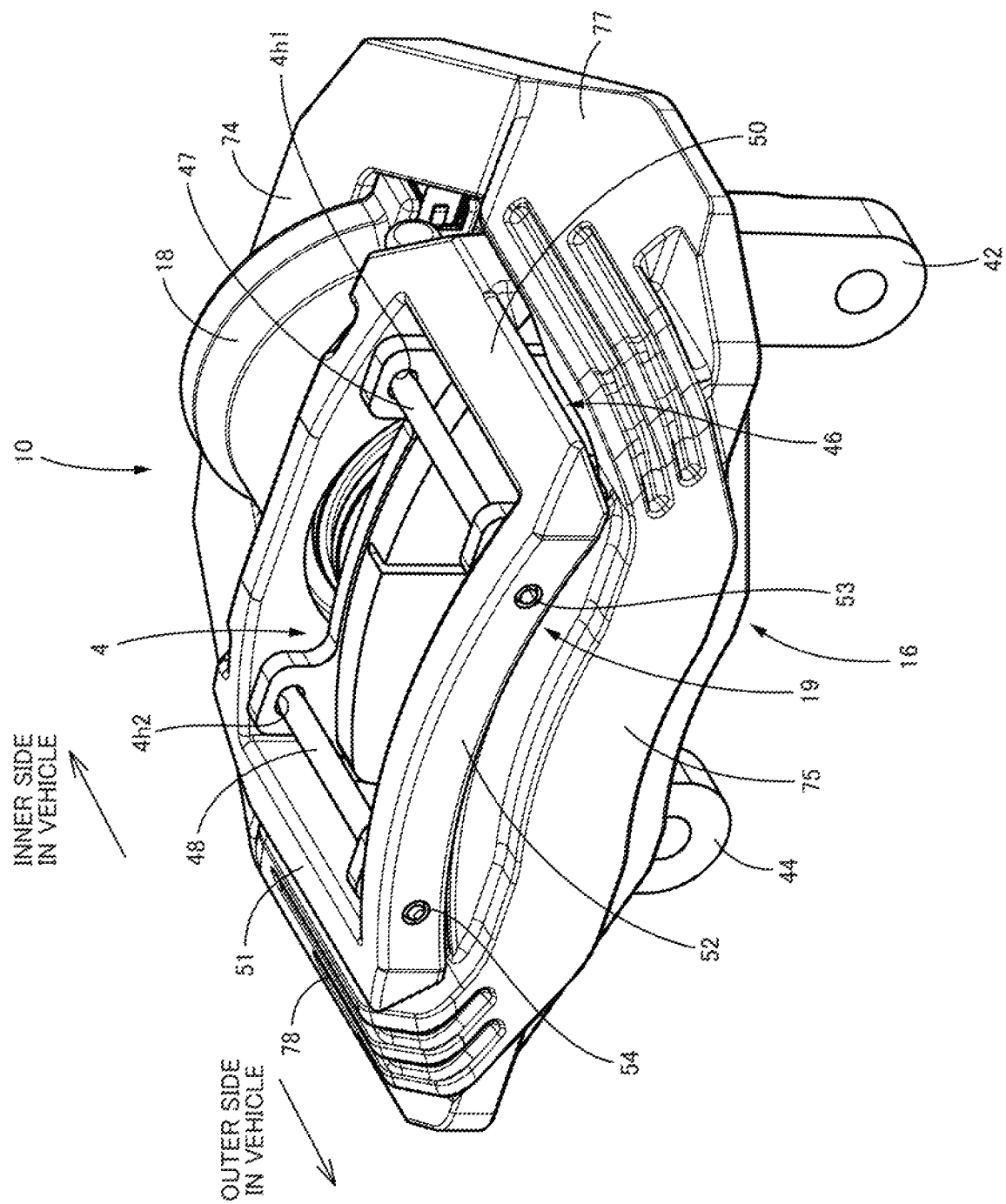
FIG. 1 is a perspective view of a disc brake according to a first embodiment.

Hereinafter, there will be described embodiments by reference to the drawings.

First Embodiment

A disc brake according to the present embodiment is a floating disc brake which is provided on a wheel of a vehicle and operable by a hydraulic pressure. As illustrated in FIGS. 1-5, the disc brake includes: a rotor 3 that is rotated together with the wheel; an inner pad 4 and an outer pad 6 located on opposite sides of the rotor 3; a pressing device 8; and a housing 10 holding the pressing device 8. The pressing device 8 includes a wheel cylinder 14 and a frame 16 as one example of a driving member. As illustrated in FIG. 2, the rotation axis L of the rotor 3 and the central axis C of the pressing device 8 are parallel with each other. In the following description, each of the direction parallel with the rotation axis L of the rotor 3 and the direction parallel with the central axis C of the pressing device 8 may be referred to simply as "axial direction". A side on which the outer pad 6 is located in the axial direction is an outer side in the vehicle, and a side on which the inner pad 4 is located in the axial direction is an inner side in the vehicle. The outer side in the vehicle and the inner side in the vehicle may be hereinafter referred to simply as "outer side" and "inner side", respectively.

Figure 6:
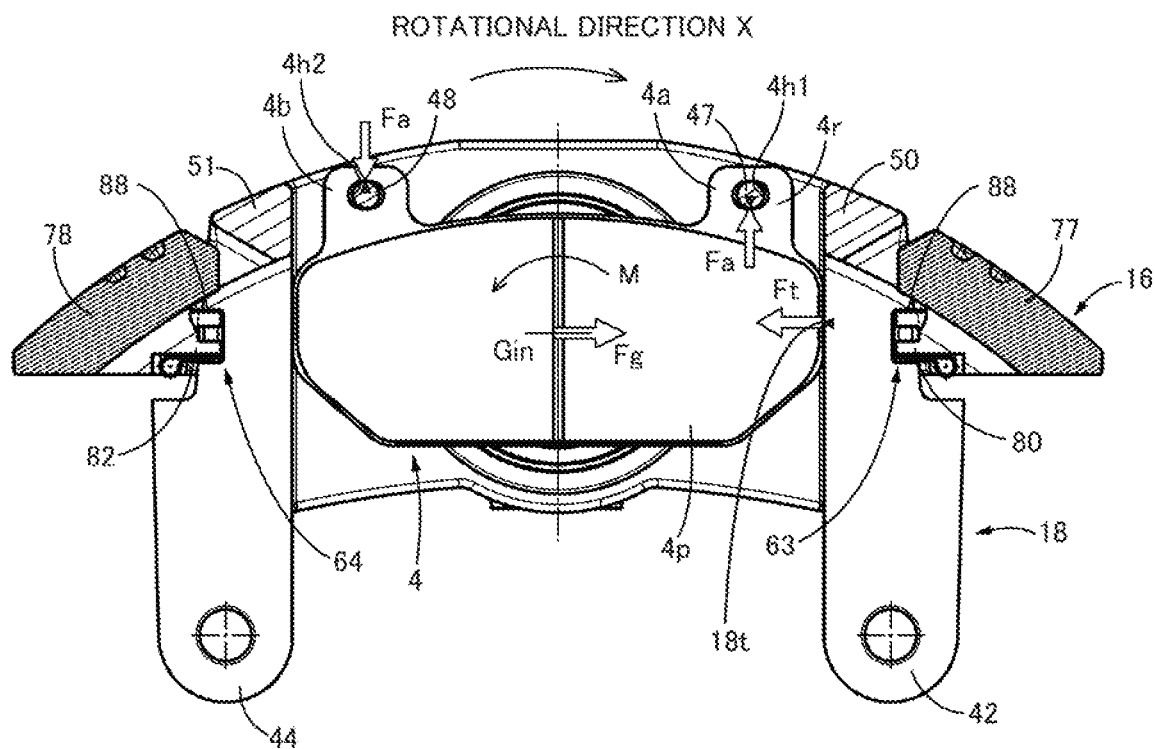
FIG. 6 is a view of the disc brake, illustrating components around an inner pad.
Figure 7:
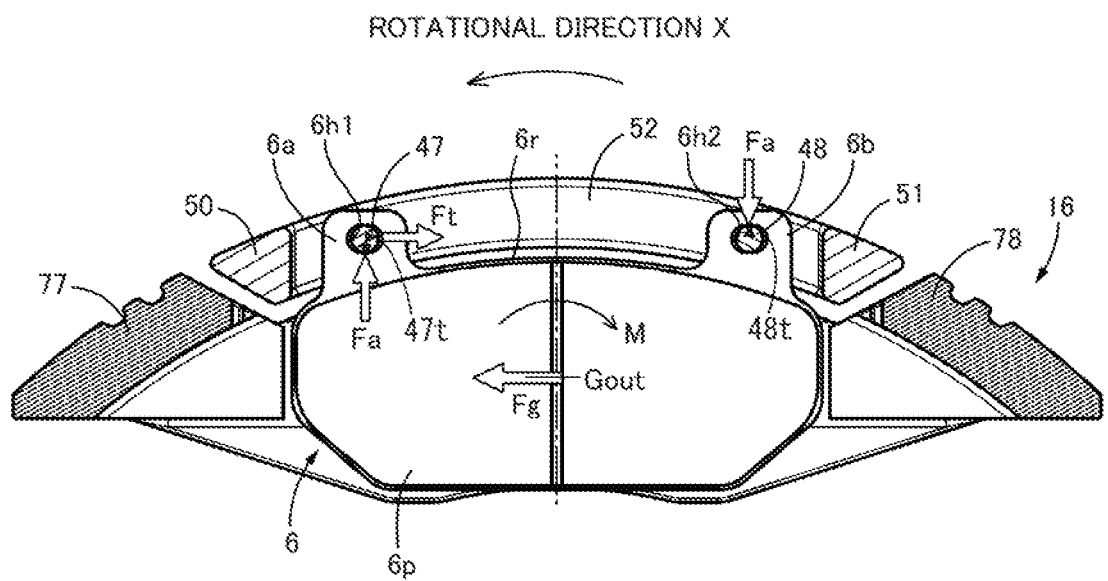
FIG. 7 is a view of the disc brake, illustrating components around an outer pad.

As illustrated in FIGS. 6 and 7, the inner pad 4 includes a back board 4r and a pad portion 4p as one example of a frictionally engageable portion which is held on the back board 4r, and the outer pad 6 includes the back board 6r and a pad portion 6p as another example of the frictionally engageable portion which is held on a back board 6r. The respective pad portions 4p, 6p of the inner pad 4 and the outer pad 6 face the rotor 3. Protrusions 4a, 4b are provided on an outer circumferential portion of the back board 4r at positions spaced apart from each other in the circumferential direction. Each of the protrusions 4a, 4b extends in the outer circumferential direction. Likewise, protrusions 6a, 6b are provided on an outer circumferential portion of the back board 6r at positions spaced apart from each other in the circumferential direction. Each of the protrusions 6a, 6b extends in the outer circumferential direction. Through holes 4h1, 4h2, 6h1, 6h2 extend through the respective protrusions 4a, 4b, 6a, 6b in the axial direction. Each of the through holes 4h1, 4h2, 6h1, 6h2 is shaped so as to be elongated in the circumferential direction.

Figure 2:
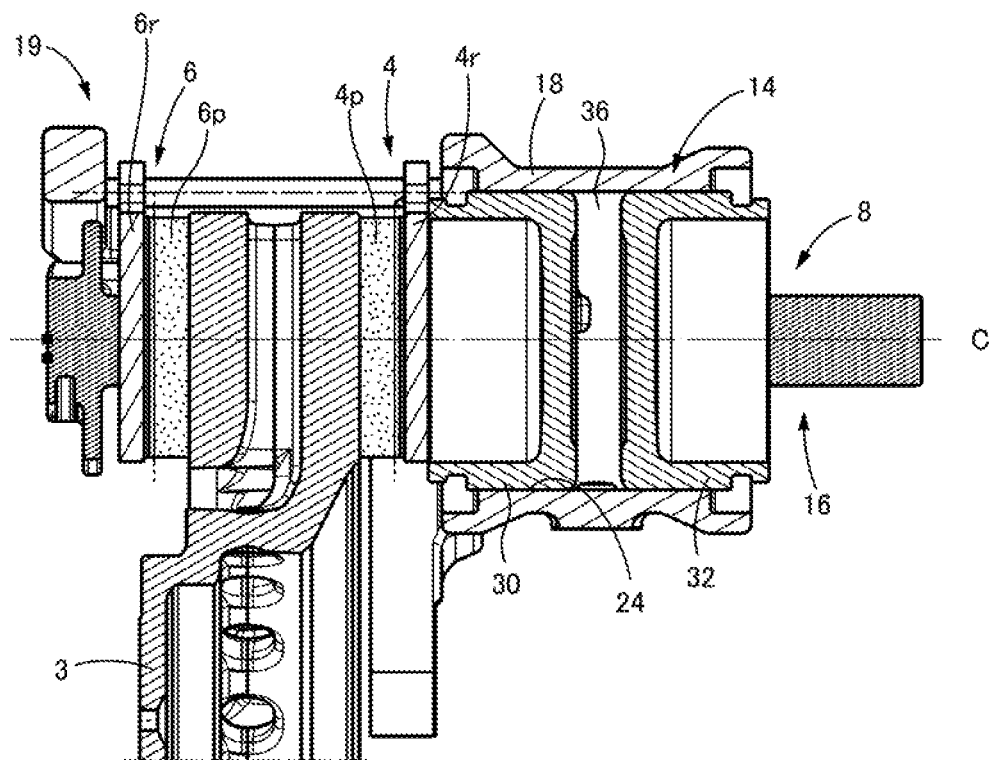
FIG. 2 is a cross-sectional view of the disc brake, taken along line II-II in FIG. 5.
Figure 4:
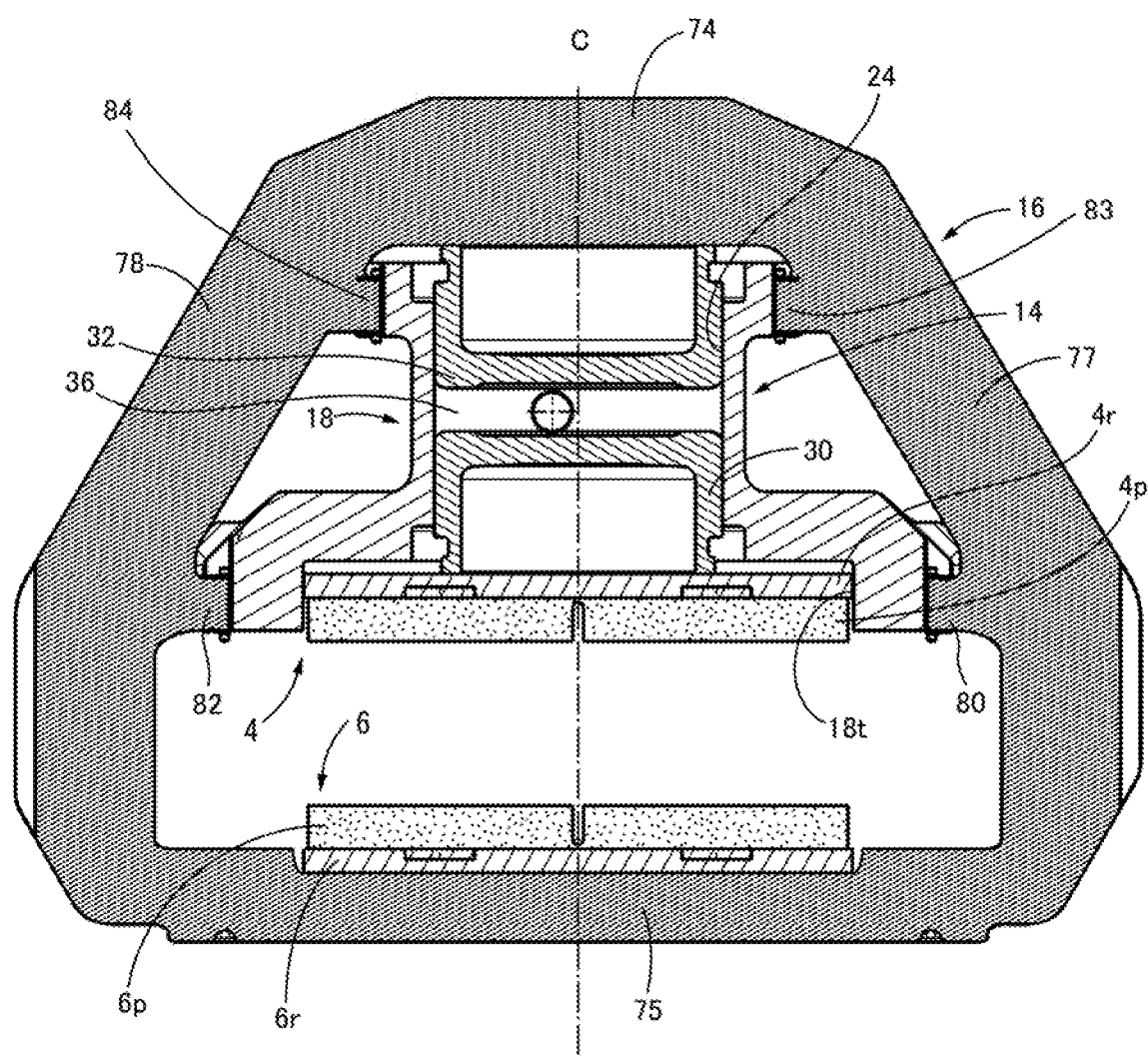
FIG. 4 is a cross-sectional view of the disc brake, taken along line IV-IV in FIG. 5.

As illustrated in FIG. 1, the housing 10 includes: a first housing portion 18 located on an inner side of the rotor 3 in the vehicle; and a second housing portion 19 extending from the first housing portion 18 toward the outside of the vehicle over the rotor 3. The first housing portion 18 extends substantially in the axial direction. As illustrated in FIGS. 2 and 4, a cylinder bore 24 is formed in the first housing portion 18 so as to extend through the first housing portion 18 in the axial direction. A first piston 30 as one example of a first pressing member and a second piston 32 as one example of a second pressing member are fluid-tightly and slidably fitted in the cylinder bore 24 via piston seals. A portion of the cylinder bore 24 between the first piston 30 and the second piston 32 serves as a hydraulic-pressure chamber 36. The first piston 30 and the second piston 32 are movable relative to each other in the axial direction.

In the present embodiment, a portion of the first housing portion 18 in which the cylinder bore 24 is formed serves as a cylinder body. Also, the wheel cylinder 14 is constituted by components including the cylinder body, the first piston 30, and the second piston 32.

Figure 5:
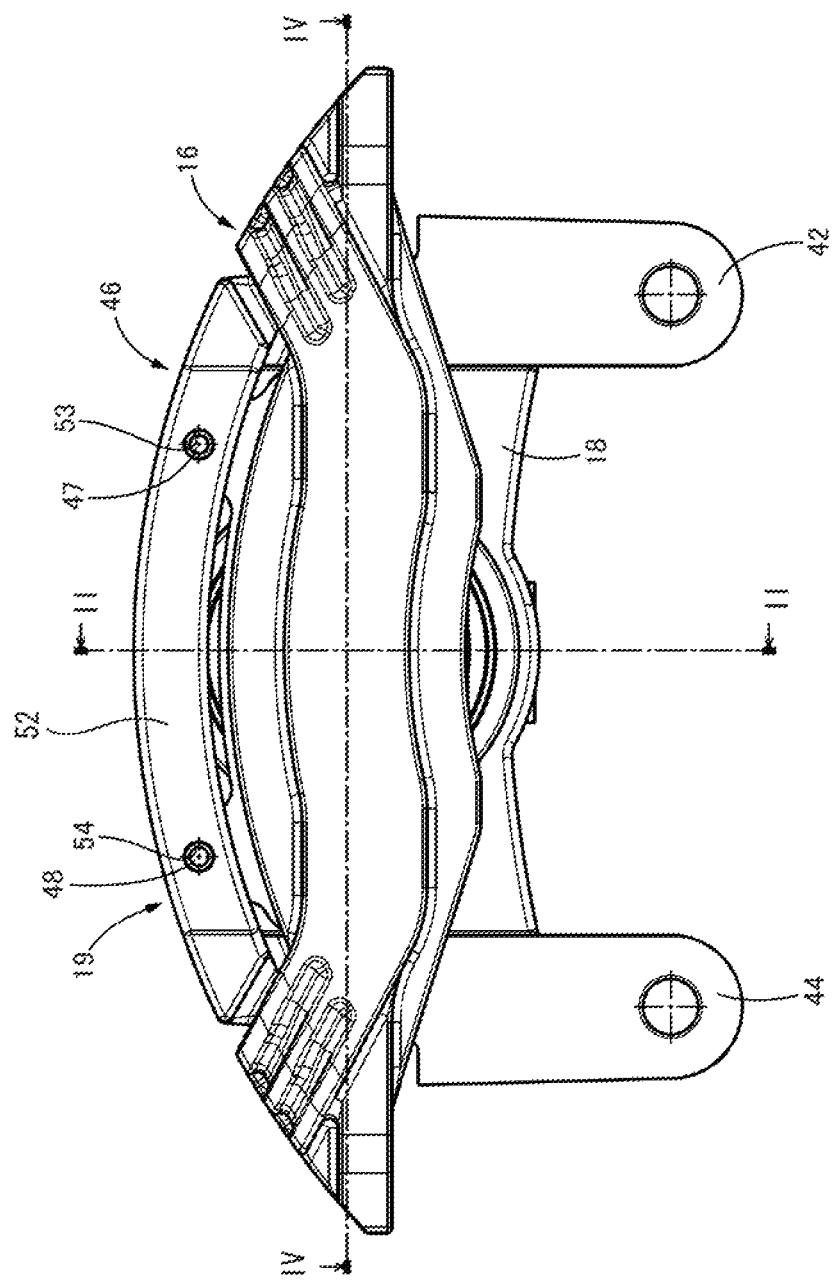
FIG. 5 is a front elevational view of the disc brake.

As illustrated in FIGS. 1 and 5, a pair of mount portions 42, 44 are provided on opposite sides, in the circumferential direction, of a rotor-side end portion of the first housing portion 18 in the axial direction. The housing 10 is secured at each of the mount portions 42, 44 to a corresponding one of suspension members (which may be also referred to as "vehicle-body-side component") such as a knuckle as one example of a non-rotating member.

Figure 3:
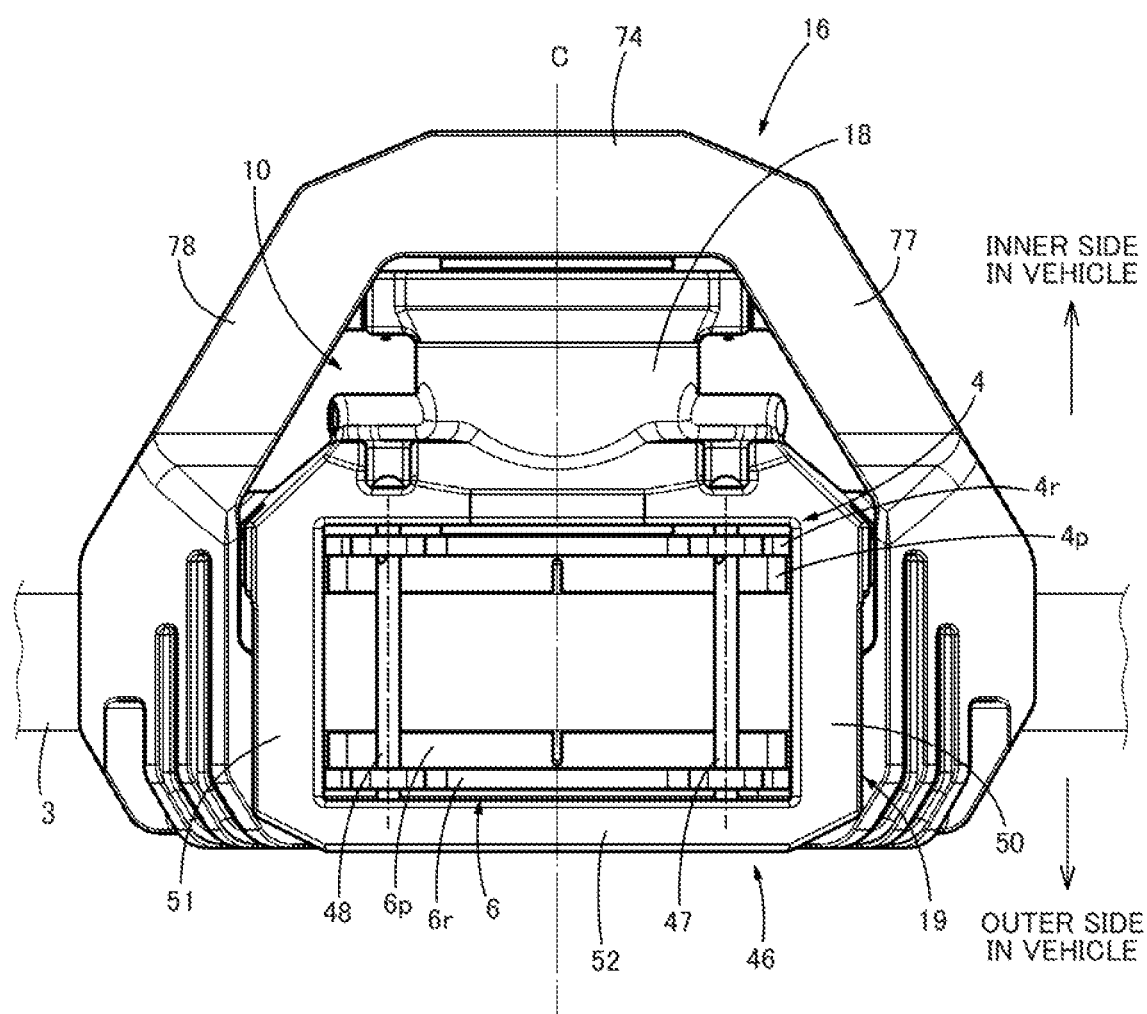
FIG. 3 is a plan view of the disc brake.

As illustrated in FIGS. 1 and 3, the second housing portion 19 includes: a bridge portion 46 having a substantially three-sided rectangular shape in plan view; and pad pins 47, 48, as one example of two support rods, each held at its opposite end portions respectively by the bridge portion 46 and the first housing portion 18. The bridge portion 46 includes: a pair of rods 50, 51 spaced apart from each other in the circumferential direction and each extending in the axial direction; and a coupler 52 coupling the rods 50, 51 to each other and extending substantially in the circumferential direction. The coupler 52 has two through holes 53, 54 spaced apart from each other in the circumferential direction. Through holes, not illustrated, are respectively formed in portions of the first housing portion 18 which correspond to the respective through holes 53, 54. The pair of pad pins 47, 48 are supported by the through holes 53, 54 formed in the bridge portion 46 and the through holes formed in the first housing portion 18 in a state in which each of the pad pins 47, 48 extends in the axial direction. The pad pin 47 extends through a corresponding one of the through holes formed in the first housing portion 18, the through hole 4h1 formed in the back board 4r of the inner pad 4, the through hole 6h1 formed in the back board 6r of the outer pad 6, and the through hole 53 of the coupler 52 in this order. The pad pin 48 extends through a corresponding one of the through holes formed in the first housing portion 18, the through hole 4h2 formed in the back board 4r of the inner pad 4, the through hole 6h2 formed in the back board 6r of the outer pad 6, and the through hole 54 of the coupler 52 in this order. Thus, the inner pad 4 and the outer pad 6 are held by the pad pins 47, 48 so as to be movable in the axial direction. Each of the inner pad 4 and the outer pad 6 is movable in the circumferential direction relative to the pad pins 47, 48 and the through holes 4h1, 4h2, 6h1, 6h2 within a region determined by a space between the pad pin 47 and each of the through holes 4h1, 6h1 and a space between the pad pin 48 and each of the through holes 4h2, 6h2.

Two pairs of engageable recessed portions engageable with the frame 16 are provided on the first housing portion 18 so as to be spaced apart from each other in the axial direction. FIG. 6 illustrates only one of the two pairs of engageable recessed portions and omits illustration of the other. As illustrated in FIG. 6, the two pairs of engageable recessed portions include: the one pair of engageable recessed portions 63, 64 provided at the rotor-side end portion of the first housing portion 18; and the other pair of engageable recessed portions, not illustrated, provided at an end portion of the first housing portion 18 which is far from the rotor 3. The engageable recessed portions 63, 64 are spaced apart from each other in the circumferential direction.

As illustrated in FIGS. 1 and 4, the frame 16 is a rigid member having a substantially frame shape and held by the first housing portion 18 so as to be movable relative to each other in the axial direction. The frame 16 includes: a first side portion 74 and a second side portion 75 extending in a direction orthogonal to the central axis C and spaced apart from each other in the axial direction; and a third side portion 77 and a fourth side portion 78 extending in a direction intersecting the first side portion 74 and the second side portion 75 and spaced apart from each other in the circumferential direction. The third side portion 77 and the fourth side portion 78 couple the first side portion 74 and the second side portion 75 to each other. The first side portion 74 and the second side portion 75 are located on opposite sides of the rotor 3 in the axial direction. The first side portion 74 is located on an inner side of the rotor 3 and opposed to the second piston 32. The second side portion 75 is located on an outer side of the rotor 3 and engaged with the outer pad 6. In the present embodiment, while the outer pad 6 is engaged with the second side portion 75 so as to be movable in the axial direction together with the second side portion 75, the outer pad 6 and the second side portion 75 are spaced apart from each other in the circumferential direction.

Each of the third side portion 77 and the fourth side portion 78 extends toward the outer and inner sides of the rotor 3. Specifically, as illustrated in FIGS. 3 and 4, each of the third side portion 77 and the fourth side portion 78 extends over the rotor 3 without extending over outer circumferential surfaces of the inner pad 4 and the outer pad 6 in the radial direction.

Figure 8:
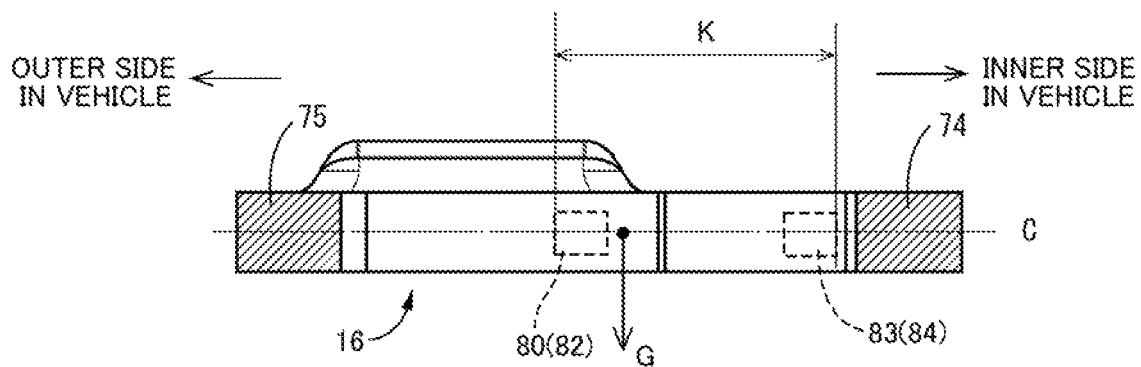
FIG. 8 is a side view of a frame of the disc brake.

As illustrated in FIGS. 4 and 6, two pairs of engageable protrusions are provided on inner surfaces of the third side portion 77 and the fourth side portion 78 which face each other at positions located on an inner side of the rotor 3. One pair of the two pairs of engageable protrusions (a pair of engageable protrusions 80, 82) are located nearer to the rotor 3 than the other pair of engageable protrusions 83, 84. As illustrated in FIG. 8, the frame 16 is designed such that the center of gravity G of the frame 16 in the axial direction is located inside a portion K of the frame 16 between the engageable protrusions 80, 82 and the engageable protrusions 83, 84.

These engageable protrusions 80, 82 of the frame 16 are engaged with the respective engageable recessed portions 63, 64 of the first housing portion 18, whereby the frame 16 is held by the housing 10 so as to be movable relative to the housing 10 in the axial direction. It is noted that leaf springs in the form of springs 88 are respectively provided between the engageable protrusion 80 and the first engageable recessed portion 63 and between the engageable protrusion 82 and the first engageable recessed portion 64. This configuration reduces positional misalignment of the frame 16 relative to the first housing portion 18 in the radial direction and the circumferential direction, resulting in reduced vibrations and abnormal sounds. In the present embodiment, a holding portion or a sliding portion is constituted by the engageable recessed portions 63, 64 and so on and the engageable protrusions 80, 82 and so on.

The disc brake configured as described above is operated by a hydraulic pressure in the hydraulic-pressure chamber 36 defined by the wheel cylinder 14. A force related to the hydraulic pressure in the hydraulic-pressure chamber 36 is applied to the first piston 30 and the second piston 32. The first piston 30 is moved toward the rotor 3 in the axial direction to press the inner pad 4 against the rotor 3. The second piston 32 is moved away from the rotor 3 in the axial direction to move the frame 16. The movement of the frame 16 presses the outer pad 6 against the rotor 3. The rotor 3 is pressed by the inner pad 4 and the outer pad 6 from opposite sides of the rotor 3, whereby the rotor 3 and each of the inner pad 4 and the outer pad 6 are brought into frictional engagement with each other. This actuates the disc brake to reduce rotation of the rotor 3, thereby reducing rotation of the wheel.

In the case where the disc brake is actuated in the case where the wheel is rotating in the direction indicated by arrow X in FIGS. 6 and 7 (hereinafter may be referred to as "rotational direction X"), torque in the rotational direction X acts on the inner pad 4 and the outer pad 6. This moves the inner pad 4 and the outer pad 6 in the X direction. The inner pad 4, as illustrated in FIG. 6, comes into contact with a torque receiver 18t of the first housing portion 18, and the outer pad 6, as illustrated in FIG. 7, comes into contact with at least one of torque receivers 47t, 48t of the respective pad pins 47, 48 in corresponding at least one of the through holes 6h1, 6h2. The shape of each of the through holes 6h1, 6h2 of the outer pad 6 and a space between the outer pad 6 and the frame 16 are designed such that the outer pad 6 comes into contact with at least one of the pad pins 47, 48 before contact of the outer pad 6 with the frame 16. The torque acting on the inner pad 4 is received by the torque receiver 18t of the first housing portion 18, and the torque acting on the outer pad 6 is received by at least one of the torque receivers 47t, 48t of the respective pad pins 47, 48 of the second housing portion 19.

For example, the outer pad 6, the second housing portion 19, and so on are designed such that the outer pad 6 moved in the rotational direction X comes into contact with the pad pin 47 first, and when the torque has increased, the outer pad 6 comes into contact with the pad pin 48.

Thus, the torque acting on the outer pad 6 is received by the housing 10 and not by the frame 16. This reduces a force applied to the frame 16 in the circumferential direction, thereby well reducing movement of the frame 16 with its rubbing against the housing 10. Also, the center of gravity of the frame 16 is located between the engageable protrusions 80, 82 and the engageable protrusions 83, 84. In other words, the center of gravity of the frame 16 is located between portions of the frame 16 which are held by the housing 10. In view of the above, it is possible to stabilize a posture of the frame 16 during operation of the disc brake, making it possible to press the outer pad 6 against the rotor 3 well. Also, it is possible to reduce the length of each of the engageable recessed portions 63, 64 and the engageable protrusions 80, 82 in the axial direction.

As illustrated in FIG. 7, a centroid Gout of the pad portion 6p of the outer pad 6 is located on an inner circumferential side of the torque receivers 47t, 48t. A force Fg in a tangent direction that is tangent to the rotational direction X is applied to the centroid Gout of the pad portion 6p of the outer pad 6. The protrusion 6b of the outer pad 6 receives a reaction force Ft from the torque receiver 47t. These forces Fg, Ft generate a moment in a direction indicated by arrow M in FIG. 7 which acts on the outer pad 6, and a couple Fa due to the moment is received by at least one of the pad pins 47, 48. This stabilizes a position of the outer pad 6 during operation of the disc brake.

The inner pad 4 has configuration and effects similar to those of the outer pad 6. Specifically, as illustrated in FIG. 6, a centroid Gin of the pad portion 4p of the inner pad 4 is located on an inner circumferential side of the torque receiver 18t of the first housing portion 18. Thus, a couple Fa due to a moment indicated by arrow M which acts on the inner pad 4 during operation of the disc brake is received by the pad pins 47, 48 and the torque receiver 18t. This stabilizes the posture of the inner pad 4.

Figure 9:
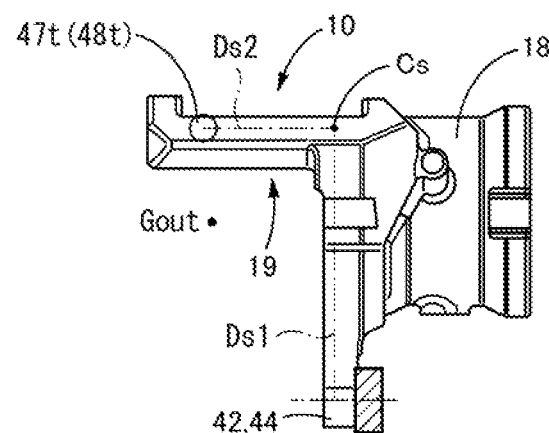
FIG. 9 is a side view of a housing of the disc brake.
Figure 10:
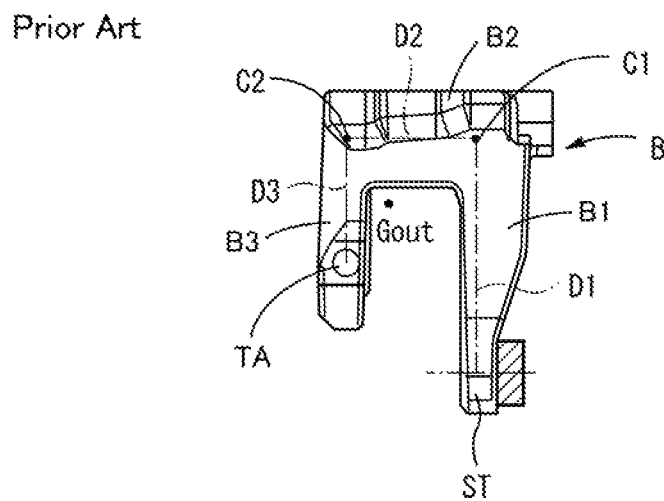
FIG. 10 is a side view of a mounting bracket of a conventional disc brake.

As illustrated in FIG. 9, in the present embodiment, the torque receivers 47t, 48t of the second housing portion 19 are located on an outer circumferential side of a position corresponding to the centroid Gout of the pad portion 6p of the outer pad 6. In contrast, in a mounting bracket B of a conventional disc brake, as illustrated in FIG. 10, a torque receiver TA is located on an inner circumferential side of a position corresponding to a centroid of a pad portion of an outer pad of the mounting bracket B (noted that this position is illustrated in FIG. 10 as a position corresponding to the centroid Gout of the pad portion 6p of the outer pad 6 in the present embodiment in the radial direction). Thus, a protrusion on an inner circumferential part of an outer portion of the vehicle is small in the present embodiment when compared with the conventional disc brake, resulting in improved mountability of the disc brake. Also, it is possible to improve the flexibility in design of the shape of the wheel.

In the conventional disc brake, as illustrated in FIG. 10, the mounting bracket B has a substantially three-sided rectangular shape in side view which includes: an inner portion B1 in the vehicle; a portion B2 extending over a rotor; and an outer portion B3 in the vehicle. The mounting bracket B is supported by, e.g., a suspension member at a mount portion ST of an inner circumferential portion of the portion B1, and the torque receiver TA is located at an inner circumferential portion of the portion B3. Thus, two joints C1, C2 are located between the mount portion ST and the torque receiver TA. The length between the mount portion ST and the torque receiver TA is equal to the sum of the distances D1, D2, D3. In the mounting bracket B, a force applied to the torque receiver TA in the circumferential direction bends the portion B3 about the joint C2, a force applied to the joint C2 in the circumferential direction bends the portions B2, B3 about the joint C1, and a force applied to the joint C1 in the circumferential direction bends the portions B1, B2, B3 about the mount portion ST. This increases an amount of bending of the mounting bracket B about the mount portion ST.

In contrast, in the disc brake according to the present embodiment, as illustrated in FIG. 9, the housing 10 has a substantially L-shape in side view. The housing 10 is mounted on the suspension member at the mount portions 42, 44 of the first housing portion 18. The torque receivers 47t, 48t are located near a vehicle-outer end portion of the second housing portion 19 which protrudes outward in the vehicle. Thus, one joint Cs is located between the mount portions 42, 44 and the torque receivers 47t, 48t. The length between the mount portions 42, 44 and the torque receivers 47t, 48t is equal to the sum of the distances Ds1, Ds2 and less than the length (D1+D2+D3) in the case of the conventional mounting bracket B.

In the case where a force is applied to the torque receiver 47t (48t) of the housing 10 in the circumferential direction, the second housing portion 19 is bent about the joint Cs, and the second housing portion 19 and the first housing portion 18 about the mount portions 42, 44. An amount of bending of the housing 10 in the present embodiment is less than an amount of bending of the conventional mounting bracket B. This allows low stiffness of the housing 10 in the present embodiment when compared with the conventional disc brake, resulting in reduced weight and size of the housing 10. Also, it is possible to improve the flexibility in design of the shape of the housing 10, for example.

Since no torque receiver is provided on the frame 16, only a force in the axial direction acts on the frame 16. Thus, by increasing the thickness of each of the first side portion 74 and the second side portion 75 of the frame 16, it is possible to reduce deformation of the frame 16. Moreover, since no torque receiver is provided on the frame 16, it is possible to reduce the thickness of each of the third side portion 77 and the fourth side portion 78 of the frame 16, resulting in reduced weight and improved workability (including formability). Also, it is possible to improve the flexibilities in design of the shape of the frame 16 and materials design. For example, carbon fiber-reinforced plastic (CFRP) may be employed.

While the torque acting on the inner pad 4 is received by the first housing portion 18, and the torque acting on the outer pad 6 is received by at least one of the pad pins 47, 48 of the second housing portion 19 in the above-described embodiment, the present disclosure is not limited to this configuration. For example, the torque acting on each of the inner pad 4 and the outer pad 6 may be received by the second housing portion 19. Specifically, the torque acting on each of the inner pad 4 and the outer pad 6 may be received by at least one of the pad pins 47, 48 of the second housing portion 19 and may be received by the bridge portion 46.

Figure 11:
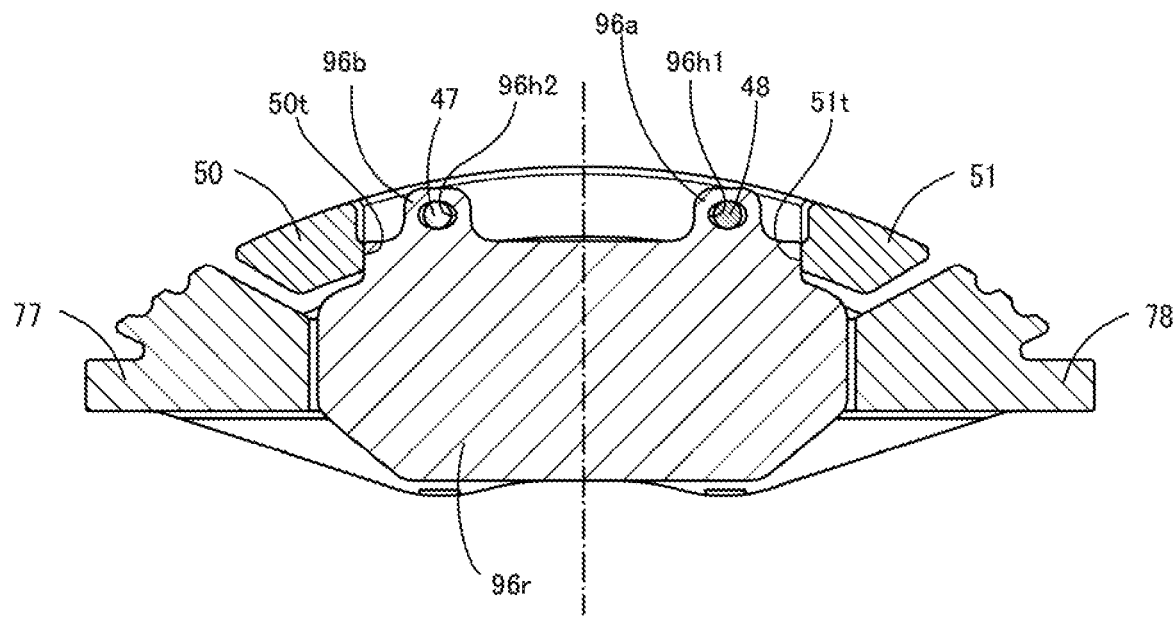
FIG. 11 is a view of the disc brake, illustrating components around another inner pad.
Figure 12:
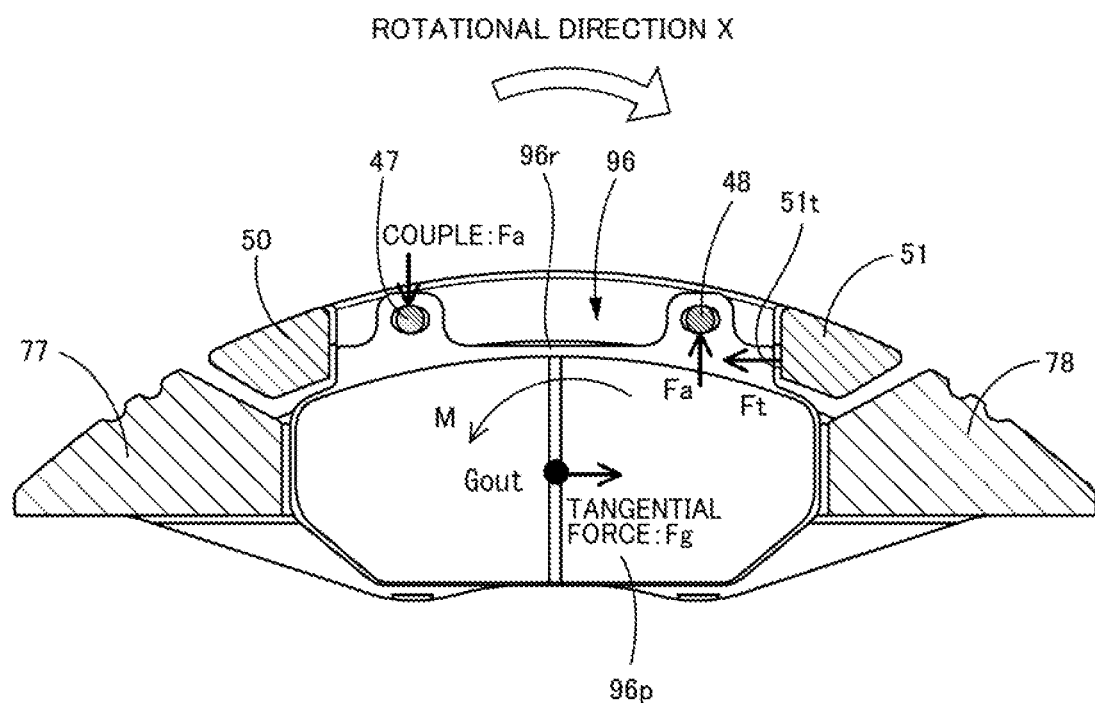
FIG. 12 is a view of the disc brake, illustrating components around another outer pad in an operating state of the disc brake.

There will be next described, with reference to FIGS. 11 and 12, a case where the torque acting on the outer pad 6 is received by the bridge portion 46 of the second housing portion 19. In the present embodiment, torque acting on an outer pad 96 is received by at least one of the rods 50, 51 (50t, 51t). The outer pad 96 and each of the rods 50, 51 are located closer to each other in the circumferential direction by increasing the circumferential-directional size of each of inner circumferential portions of protrusions 96a, 96b respectively having through holes 96h1, 96h2 in the outer pad 96, by reducing the distance between the rods 50, 51 in the circumferential direction in the bridge portion 46, or by increasing the width of each of the rods 50, 51 in the circumferential direction, for example.

In the case where the disc brake is actuated when the wheel is rotating in the direction indicated by arrow X, the outer pad 96 is moved in the X direction by torque acting on the outer pad 96 in the X direction, so that a back board 96r is brought into contact with the rod 51, and the torque is received by a torque receiver 51t. The outer pad 96 receives the reaction force Ft, and the force Fg in the tangent direction acts on a centroid Gout of a pad portion 96p. It is noted that the centroid Gout of the pad portion 96p is located on an inner circumferential side of the torque receiver 51t in the outer pad 96. Thus, a moment in the direction indicated by arrow M acts on the outer pad 96, and its couple Fa is received by the pad pins 47, 48 and the torque receiver 51t. This suppresses the moment on the outer pad 96 well to stabilize the posture of the outer pad 96.

Figure 13:
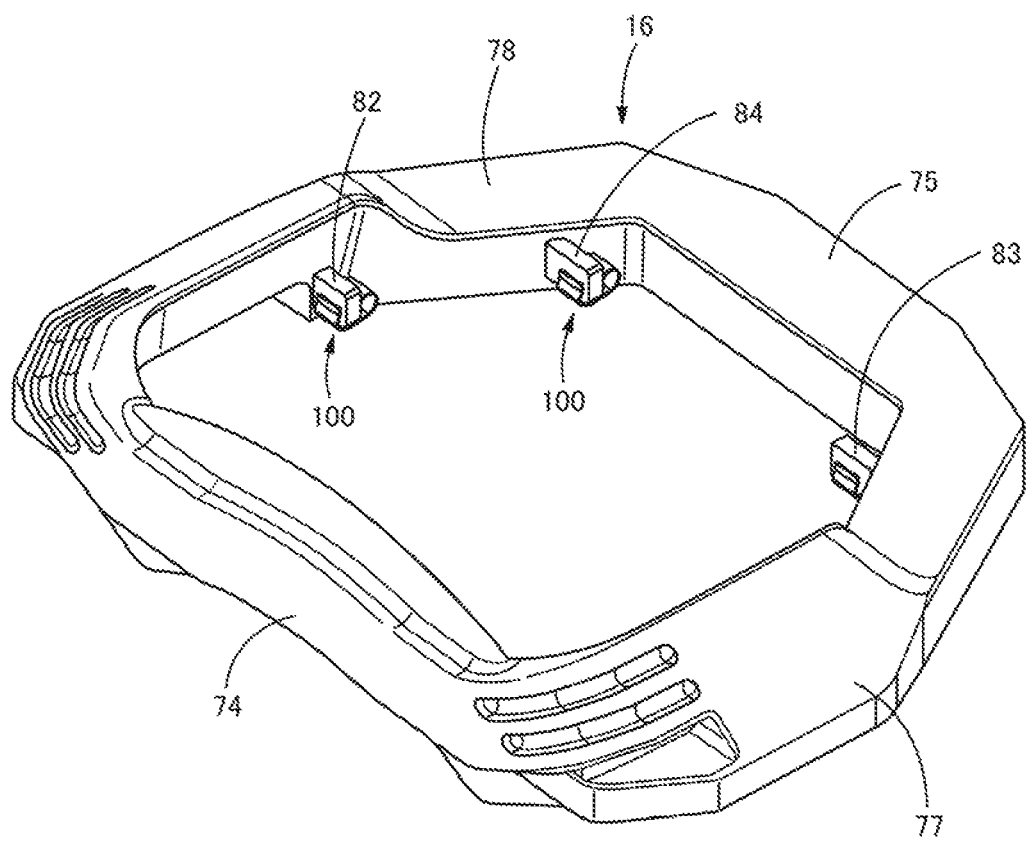
FIG. 13 is a view of springs mounted on the frame of the disc brake.

Springs 100 each having a shape illustrated in FIG. 13 may be provided between the engageable recessed portion 63 formed in the first housing portion 18 and the engageable protrusion 80 provided on the frame 16 and between the engageable recessed portion 64 formed in the first housing portion 18 and the engageable protrusion 82 provided on the frame 16. For example, each of the springs 100 is provided so as to cover an inner circumferential surface of a corresponding one of the engageable protrusions 80, 82. Thus, each of the engageable recessed portions 63, 64 and a corresponding one of the engageable protrusions 80, 82 may come into direct contact with each other at their respective surfaces facing each other in the circumferential direction. In the case where each of the frame 16 and the first housing portion 18 is formed of a material containing iron, for example, rust can be scraped by sliding movement of these surfaces relative to each other. It is noted that, since movement of the frame 16 with its rubbing against the housing 10 is reduced, it is possible to reduce the length of each of the engageable recessed portions 63, 64 and the corresponding one of the engageable protrusions 80, 82 in the axial direction, and accordingly there is no problem in the case where irons are brought into surface contact with each other.

The engageable recessed portions 63, 64 and the engageable protrusions 80-84 are not essential.

Second Embodiment

The pad pins 47, 48 are not essential, and an inner pad 104 and an outer pad 106 may be held by a bridge portion so as to be movable in the axial direction. FIGS. 14-17 illustrate a disc brake including such a configuration.

The present disc brake includes: the inner pad 104 and the outer pad 106 located on opposite sides of a rotor 103; a pressing device 108 that presses the inner pad 104 and the outer pad 106 against the rotor 103; and a housing 110 holding the pressing device 108. The pressing device 108 includes a wheel cylinder 114 and a frame 116 as another example of the driving member.

Figure 14:
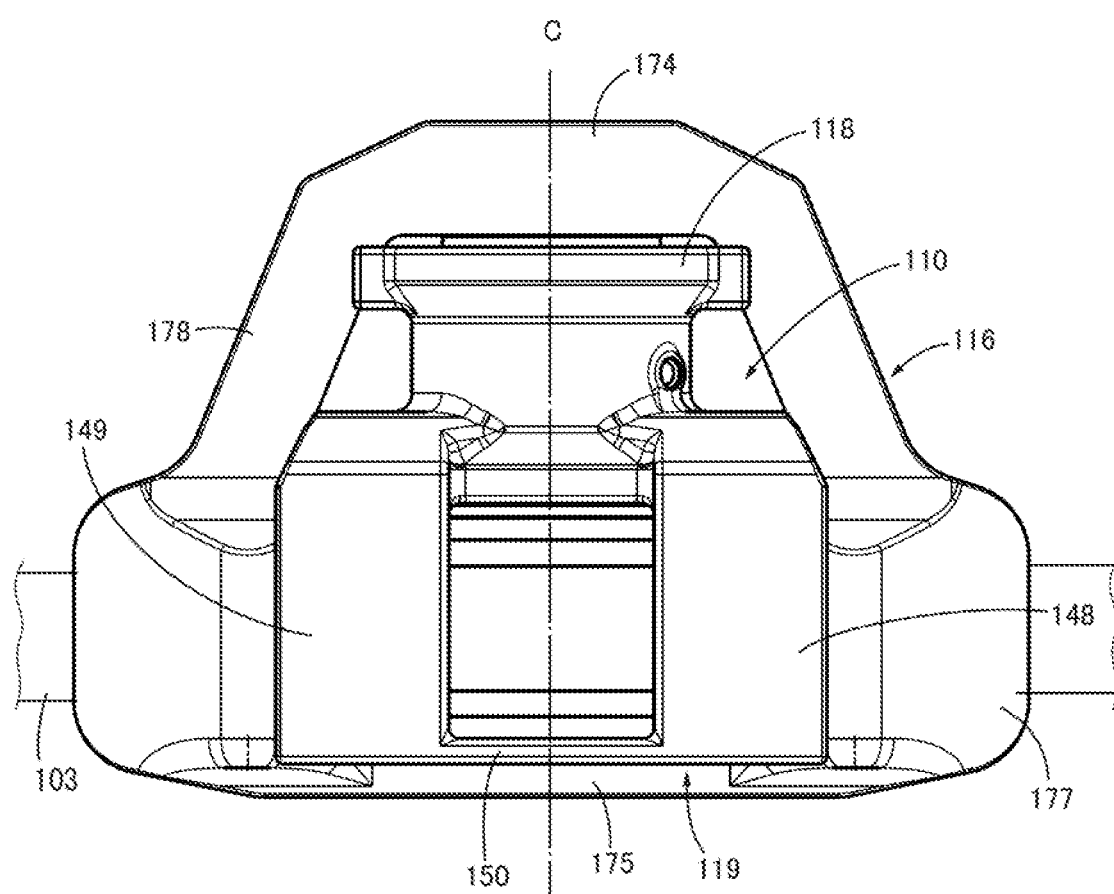
FIG. 14 is a plan view of a disc brake according to a second embodiment.
Figure 15:
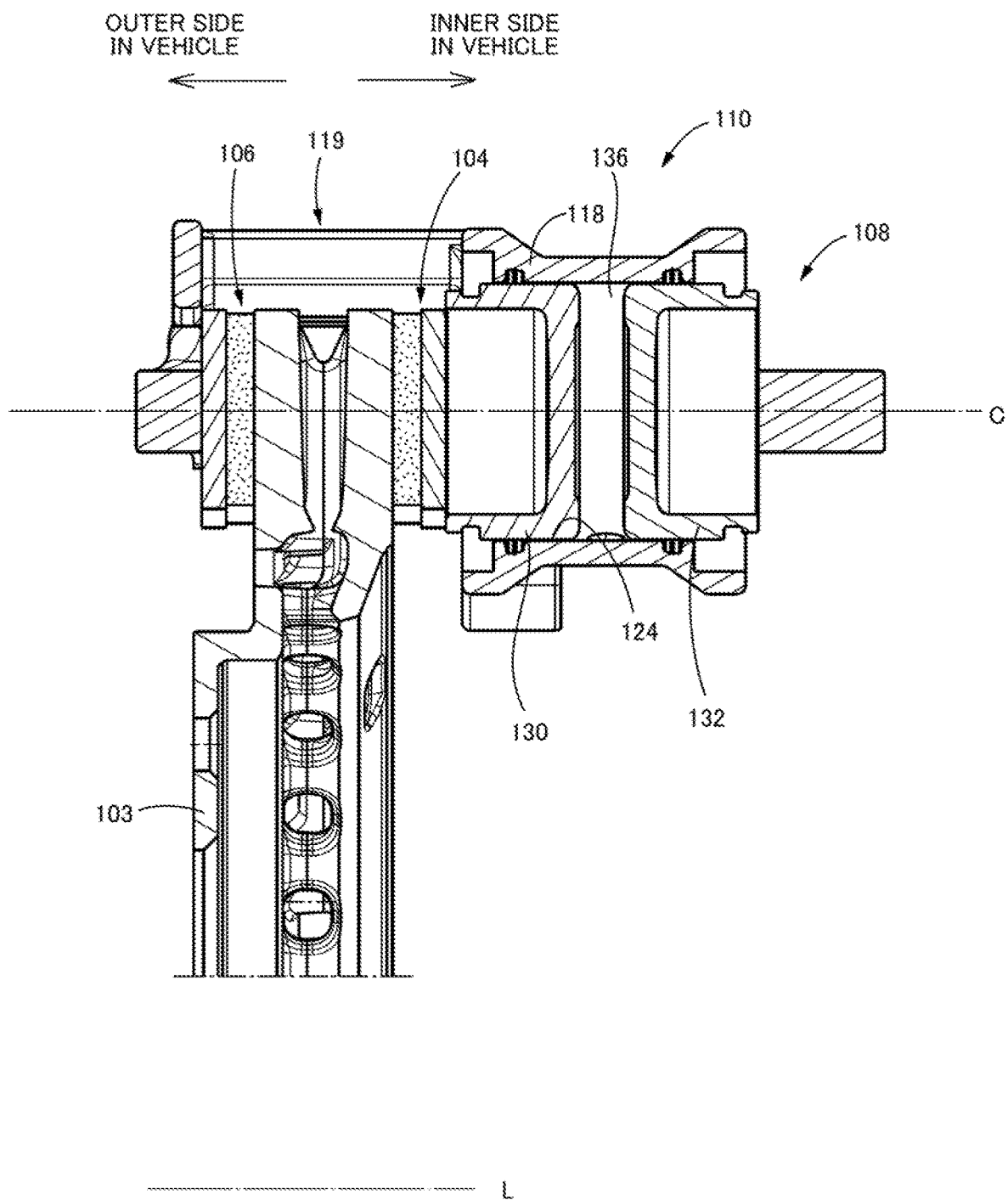
FIG. 15 is a cross-sectional view of the disc brake, taken along a direction orthogonal to an axial direction.
Figure 17:
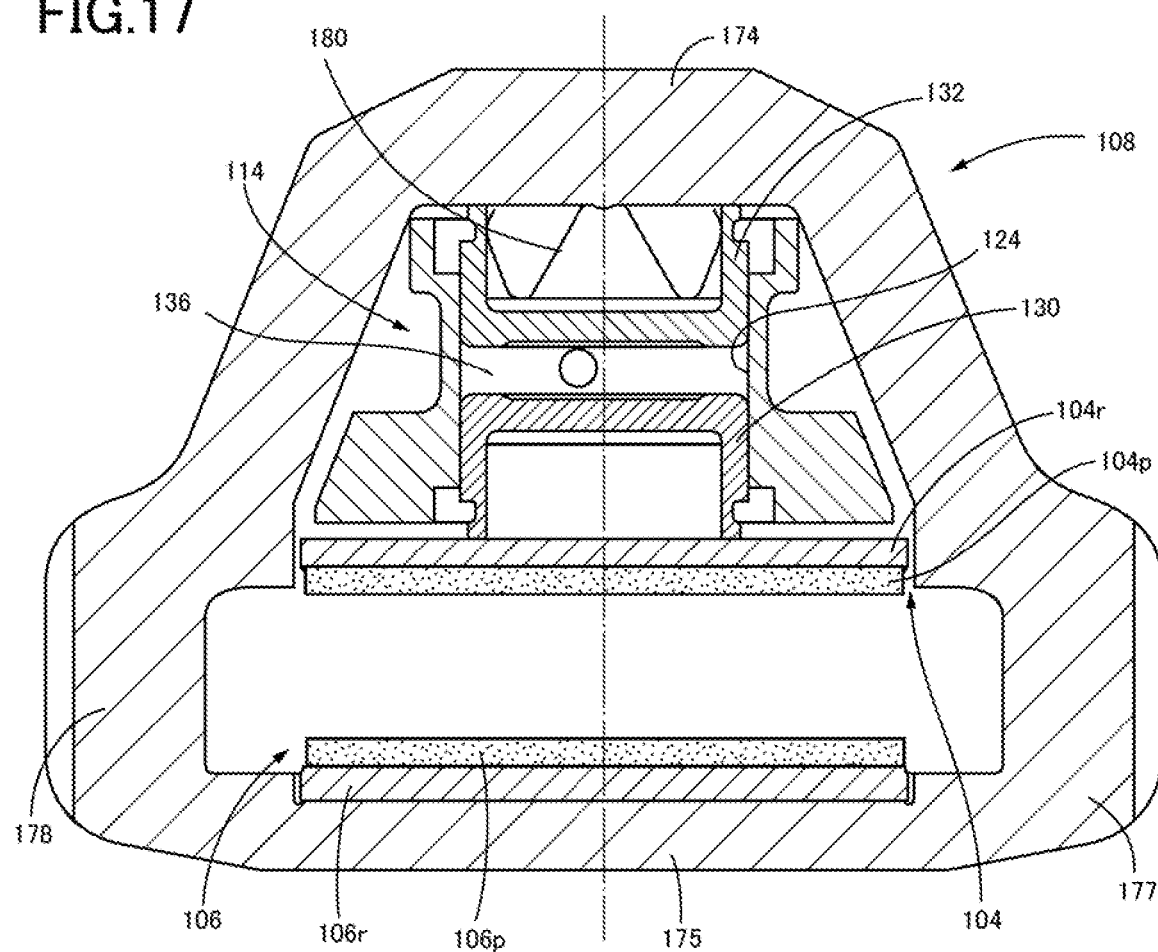
FIG. 17 is a cross-sectional view of the disc brake, taken along a direction parallel with the axial direction.

As illustrated in FIGS. 14 and 15, the housing 110 includes: a first housing portion 118 located on an inner side of the rotor 103 in the vehicle; and a second housing portion 119 extending from the first housing portion 118 over the rotor 103 to the outside of the vehicle. As illustrated in FIGS. 15 and 17, a cylinder bore 124 is formed in the first housing portion 118 so as to extend through the first housing portion 118 in the axial direction. A first piston 130 as another example of the first pressing member and a second piston 132 as another example of the second pressing member are fluid-tightly and slidably fitted in the cylinder bore 124 via piston seals. A portion of the cylinder bore 124 between the first piston 130 and the second piston 132 serves as a hydraulic-pressure chamber 136.

In the present embodiment, a portion of the first housing portion 118 in which the cylinder bore 124 is formed serves as a cylinder body. The wheel cylinder 114 is constituted by the cylinder body, the first piston 130, and the second piston 132.

The inner pad 104 includes a back board 104r and a pad portion 104p held on the back board 104r. The inner pad 106 includes a back board 106r and a pad portion 106p held on the back board 106r. The respective pad portions 104p, 106p of the inner pad 104 and the outer pad 106 face the rotor 103. Each of the back boards 104r, 106r is provided at its outer circumferential portion with protrusions 140, 141, 142, 143 spaced apart from each other in the circumferential direction and each extending toward an outer circumferential side. Each of the protrusions 140-143 may, for example, have a stepped shape in the radial direction and include an inner circumferential portion and an outer circumferential portion that is greater than the inner circumferential portion in width in the circumferential direction.

Figure 16:
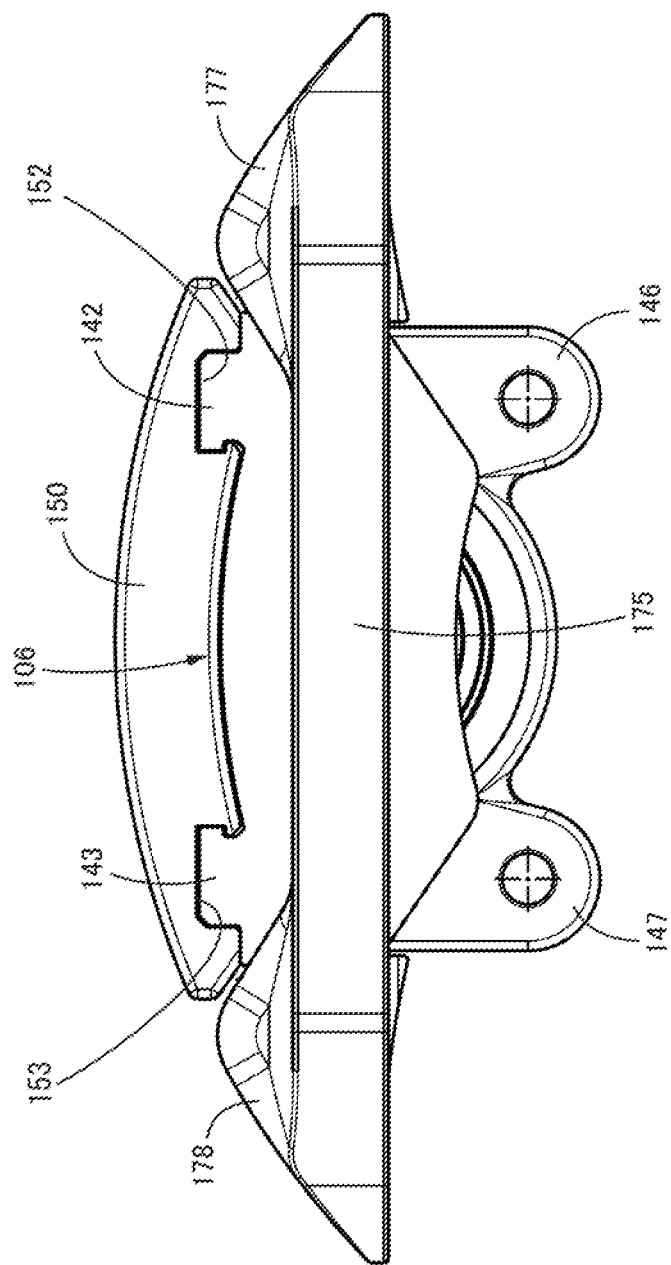
FIG. 16 is a front elevational view of the disc brake.

As illustrated in FIG. 16, a pair of mount portions 146, 147 are provided on opposite sides, in the circumferential direction, of a rotor-side end portion of the first housing portion 118 in the axial direction. The housing 110 is secured at each of the mount portions 146, 147 to a corresponding one of suspension members (which may be also referred to as "vehicle-body-side component") such as a knuckle as another example of the non-rotating member.

Figure 18:
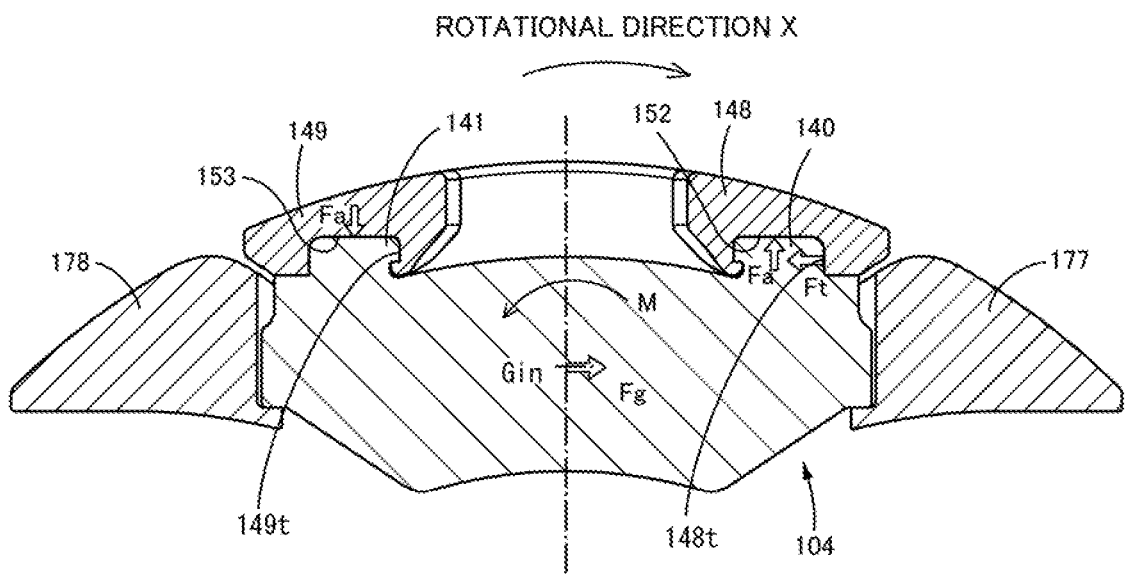
FIG. 18 is a view of the disc brake, illustrating components around an outer pad.

As illustrated in FIG. 14, the second housing portion 119 includes the bridge portion having a substantially three-sided rectangular shape in plan view. The second housing portion 119 includes: a pair of rods 148, 149 spaced apart from each other in the circumferential direction and each extending in the axial direction; and a coupler 150 coupling the rods 148, 149 to each other and extending substantially in the circumferential direction. As illustrated in FIG. 18, inner circumferential portions of the respective rods 148, 149 have groove portions 152, 153 each extending in the axial direction. Each of the groove portions 152, 153 extends to an outer end face of the coupler 150 in the vehicle. Each of the groove portions 152, 153 has a shape corresponding to ones of the protrusions 140-143 of each of the inner pad 104 and the outer pad 106. Specifically, an outer circumferential portion of each of the groove portions 152, 153 is greater than an inner circumferential portion thereof in width in the circumferential direction. The protrusions 140, 142 of each of the inner pad 104 and the outer pad 106 are fitted in the groove portion 152 of the rod 148, and the protrusions 141, 143 of each of the inner pad 104 and the outer pad 106 are fitted in the groove portion 153 of the rod 149, whereby the inner pad 104 and the outer pad 106 are held by the housing 110 so as to be movable in the axial direction.

As illustrated in FIGS. 14 and 17, the frame 116 is a rigid member having a substantially frame shape and held by the first housing portion 118 so as to be movable relative to each other in the axial direction. The frame 116 includes: a first side portion 174 and a second side portion 175 extending in the direction orthogonal to the central axis C and spaced apart from each other in the axial direction; and a third side portion 177 and a fourth side portion 178 extending in a direction intersecting the first side portion 174 and the second side portion 175 and spaced apart from each other in the circumferential direction. The third side portion 177 and the fourth side portion 178 couple the first side portion 174 and the second side portion 175 to each other. The first side portion 174 and the second side portion 175 are located on opposite sides of the rotor 103 in the axial direction. The first side portion 174 is located on an inner side of the rotor 103 in the vehicle. The second side portion 175 is located on an outer side of the rotor 103 in the vehicle.

The outer pad 106 is engaged with the second side portion 175 so as to be movable in the axial direction together with the second side portion 175. The outer pad 106 and the second side portion 175 are spaced apart from each other in the circumferential direction. The second piston 132 is engaged with the first side portion 174 via a spring 180. This configuration enables the first side portion 74 and the second piston 132 to move together in the axial direction. Thus, in the present embodiment, the frame 116 is engaged with the second piston 132 and held by the second housing portion 119 via the outer pad 106. Each of the third side portion 177 and the fourth side portion 178 extends to an inner side and an outer side of the rotor 103 in the vehicle. As illustrated in, e.g., FIGS. 16 and 17, each of the third side portion 177 and the fourth side portion 178 extends over the rotor 103 without extending over outer sides of the inner pad 104 and the outer pad 106 in the radial direction.

The disc brake configured as described above is operated by a hydraulic pressure in the hydraulic-pressure chamber 136 formed in the wheel cylinder 114. The hydraulic pressure in the hydraulic-pressure chamber 136 moves the first piston 130 in the axial direction toward the rotor 103 to press the inner pad 104 against the rotor 103. The second piston 132 is moved in the axial direction away from the rotor 103 to move the frame 116, thereby pressing the outer pad 106 against the rotor 103. The inner pad 104 and the outer pad 106 are pressed against the rotor 103 from opposite sides thereof and frictionally engaged with the rotor 103. As a result, the disc brake is operated to reduce rotation of the rotor 103, thereby reducing rotation of the wheel.

In the case where the disc brake is actuated when the wheel is rotating in the direction indicated by arrow X, as illustrated in FIG. 18, torque in the rotational direction acting on the inner pad 104 is received by at least one of wall surfaces of the groove portions 152, 153 of the respective rods 148, 149. A portion of the wall surface of the groove portion 152 of the respective rod 148 which contacts the protrusion 140 of the back board 104*r* serves as a torque receiver 148*t*. A portion of the wall surface of the groove portion 153 of the respective rod 149 which contacts the protrusion 141 of the back board 104*r* serves as a torque receiver 149*t*. A couple Fa of a moment in a direction M in the inner pad 104 due to a force Fg in the tangent direction acting on a centroid Gin of the pad portion 104*p*, and a reaction force Ft applied from at least one of the torque receivers 148*t*, 149*t* is received principally by a bottom surface of the trailing-side groove portion 152. This stabilizes the posture of the inner pad 104. It is noted that the outer pad 6 has configuration and effects similar to those of the inner pad 4.

Thus, the torque acting on the inner pad 104 and the outer pad 106 is received not by the frame 116 but by the housing 110. This reduces movement of the frame 116 with its rubbing against the housing 110. The frame 116 is engaged with the second piston 132 so as to be movable in the axial direction together with the second piston 132 and is held by the second housing portion 119 via the outer pad 106 fitted to the frame 116. This eliminates the need of the engageable protrusions 80-84 and the engageable recessed portions 63, 64 provided in the above-described embodiment. That is, a sliding portion between the frame 116 and the first housing portion 118 becomes unnecessary. This accordingly reduces loss of sliding, making it possible to reduce loss of energy. Also, it is possible to facilitate working the frame 116 and the first housing portion 118, resulting in reduced cost. Moreover, the pad springs for holding the inner pad 104 and the outer pad 106 become unnecessary, resulting in reduced cost.

It is preferably to provide a spring, not illustrated, between the outer pad 106 and the frame 116, for example, so as to allow movement of the outer pad 106 in the circumferential direction in the frame 116 and well allow movement of the frame 116 with movement of the outer pad 106 in the axial direction.

A plurality of the first pistons and a plurality of the second pistons may be provided so as to be arranged in the circumferential direction. While the embodiments have been described above, it is to be understood that the disclosure is not limited to the details of the illustrated embodiments, but may be embodied with various changes and modifications, which may occur to those skilled in the art, without departing from the spirit and scope of the disclosure. For example, the disc brake is not limited to the hydraulic brake and may be an electric brake operable by driving of an electric motor.

What is claimed is:

1. A disc brake of a floating type, comprising:
   an inner pad and an outer pad respectively located on opposite sides of a rotor rotatable with a wheel of a vehicle;
   a pressing device configured to press the inner pad and the outer pad against the rotor; and
   a housing mounted on a non-rotating member and holding the pressing device,
   wherein the pressing device comprises:
      at least one first pressing member and at least one second pressing member held by the housing, the at least one first pressing member being movable toward the rotor, the at least one second pressing member being movable away from the rotor; and
      a driving member held by the housing so as to be movable relative to the housing in an axial direction parallel with a rotation axis of the rotor, the driving member being configured to be moved by movement of the at least one second pressing member to press the outer pad against the rotor, and
   wherein the housing is provided with a torque receiver that receives torque acting on the outer pad in operation of the disc brake,
   wherein the housing comprises:
      a first housing portion provided on an inner side of the rotor in the vehicle and holding the at least one first pressing member and the at least one second pressing member; and
      a second housing portion extending from the first housing portion toward an outer side of the rotor in the vehicle,
   wherein the torque receiver is provided at the second housing portion,
   wherein the second housing portion comprises:
      a bridge portion having a substantially three-sided rectangular shape; and
      at least one support rod held by the bridge portion and the first housing portion, the at least one support rod extending in the axial direction, the at least one support rod holding the outer pad such that the outer pad is movable in the axial direction, and
   wherein the torque receiver is provided at the bridge portion or the at least one support rod.

2. The disc brake according to claim 1,
   wherein the outer pad comprises a back board and a frictionally engageable portion held by the back board and frictionally engageable with the rotor, and
   wherein the torque receiver is provided at a portion of the housing which is located on an outer circumferential side of a portion of the housing which corresponds to a centroid of the frictionally engageable portion of the outer pad.

3. The disc brake according to claim 1,
   wherein the second housing portion comprises two support rods spaced apart from each other in a circumferential direction, as the at least one support rod, and
   wherein the inner pad and the outer pad are respectively held by the two support rods so as to be movable in the axial direction.

4. A disc brake of a floating type, comprising:
   an inner pad and an outer pad respectively located on opposite sides of a rotor rotatable with a wheel of a vehicle;
   a pressing device configured to press the inner pad and the outer pad against the rotor; and
   a housing mounted on a non-rotating member and holding the pressing device,
   wherein the pressing device comprises:
      at least one first pressing member and at least one second pressing member held by the housing, the at least one first pressing member being movable toward the rotor, the at least one second pressing member being movable away from the rotor;
      a driving member held by the housing so as to be movable relative to the housing in an axial direction parallel with a rotation axis of the rotor, the driving member being configured to be moved by movement of the at least one second pressing member to press the outer pad against the rotor,
   wherein the housing is provided with a torque receiver that receives torque acting on the outer pad in operation of the disc brake,
   wherein one of: a group of two pairs of engageable recessed portions; and a group of two pairs of engageable protrusions is provided on the driving member, and the two pairs as the one are spaced apart from each other in the axial direction,
   wherein the other of: the group of the two pairs of engageable recessed portions; and the group of the two pairs of engageable protrusions is provided on the housing, and the two pairs as the other are spaced apart from each other in the axial direction,
   wherein the two pairs of engageable protrusions and the two pairs of engageable recessed portions are engaged with each other to cause the driving member to be held by the housing so as to be movable relative to the housing in the axial direction, and
   wherein a center of gravity of the driving member is located in the axial direction between the two pairs as the one.

* * * * *